Aug. 15, 1967 YASUSABURO KOBORI 3,336,045
SAFETY DEVICES FOR VEHICLES
Filed Aug. 18, 1965 3 Sheets-Sheet 1
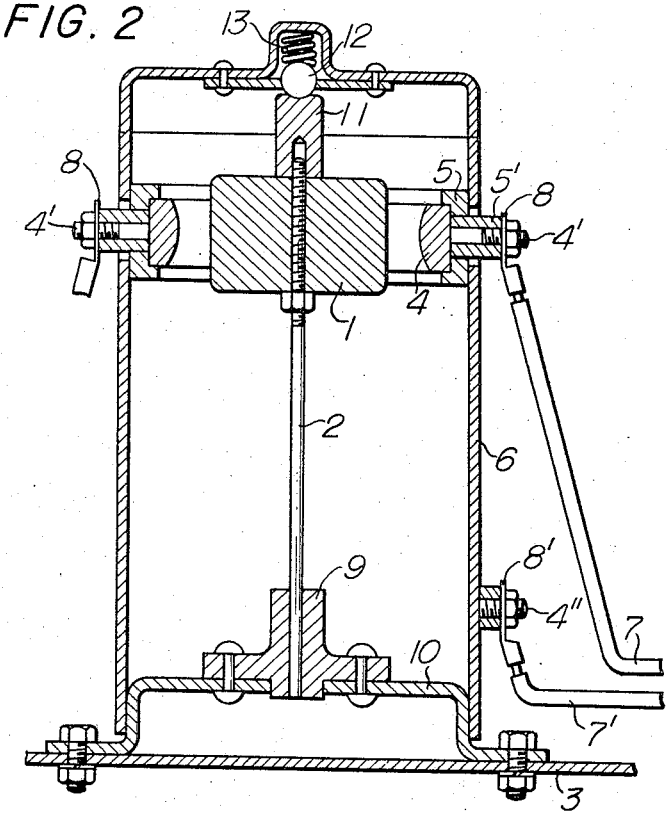
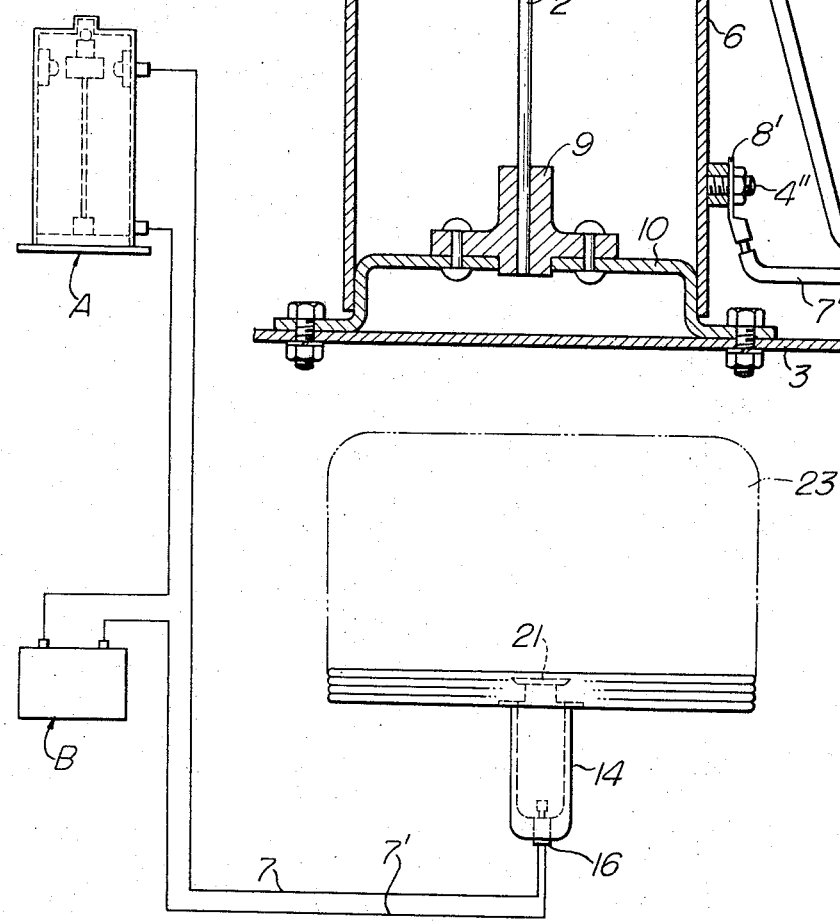
INVENTOR
Yasusaburo Kobori
BY Karl W. Flocks
ATTORNEY Aug. 15, 1967  YASUSABURO KOBORI  3,336,045
SAFETY DEVICES FOR VEHICLES
Filed Aug. 18, 1965  3 Sheets-Sheet 2
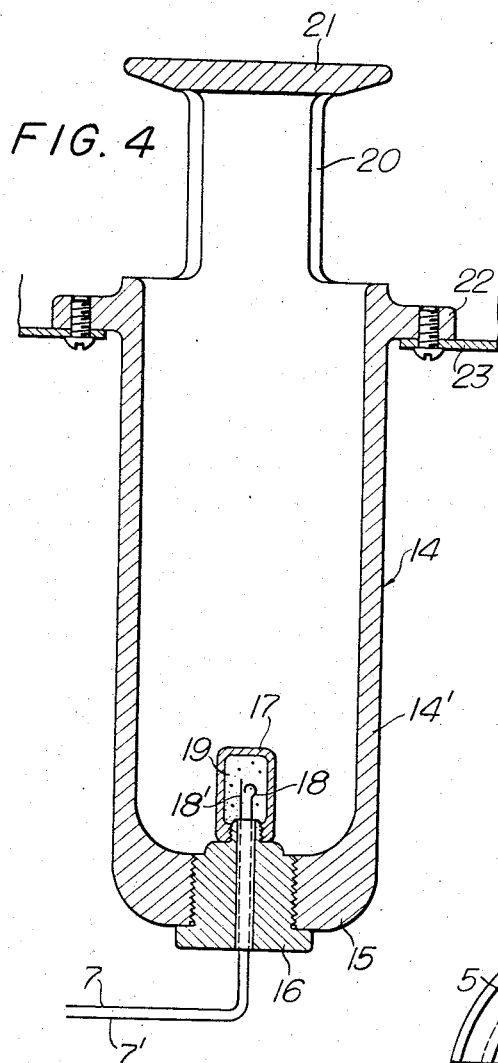
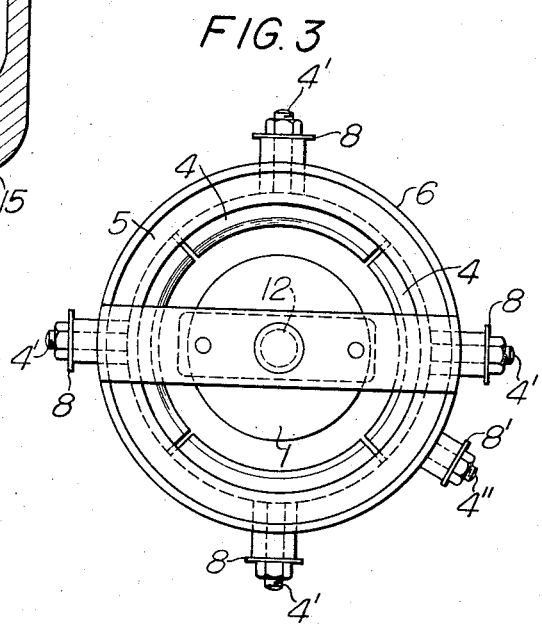
INVENTOR
Yasusaburo Kobori
BY Karl W. Flocks
ATTORNEY Aug. 15, 1967  YASUSABURO KOBORI  3,336,045
SAFETY DEVICES FOR VEHICLES Filed Aug. 18, 1965  3 Sheets-Sheet 3

INVENTOR
Yasusaburo Kobori
BY Karl W. Flocks
ATTORNEY

United States Patent Office 3,336,045
Patented Aug. 15, 1967

3,336,045
SAFETY DEVICES FOR VEHICLES
Yasusaburo Kobori, 31 Mita-Minamiteramachi, Shiba, Minato-ku, Tokyo, Japan
Filed Aug. 18, 1965, Ser. No. 480,621
Claims priority, application Japan, June 19, 1965, 40/36,254
3 Claims. (Cl. 280—150)

ABSTRACT OF THE DISCLOSURE

A system for protecting vehicle passengers in a moving vehicle in which an inertia-responsive switch operates due to an impact greater than the predetermined value and activates fluid-pressure generator inflating protective bags at different locations in a vehicle compartment to prevent whip lash and the impact-type injuries to the passengers.

Figure 5:
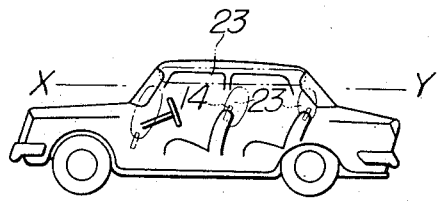

This invention relates to a device for the protection of life of the driver or passengers of an automobile or other moving vehicle in the event of a crash. With the alarming increase, year by year, of auto fatalities, the development of an effective safety device for automobiles is becoming a matter of vital importance. The safety seat-belt cannot be regarded as a perfect answer to the problem. It may be effective to a certain extent in a minor head-on crash, but it cannot be expected to serve as a safeguard against all the contingencies of complicated crashes. For example, the seat-belt will offer no protection whatsoever against the risks of "whiplash" injuries in a rear-end collision.

The critical moment in the event of a crash is the moment when the boy hits a rigid structure of the vehicle. If it were possible to create an effective impact-absorbing cushion in front of such rigid structure before the critical moment of bodily impact, the body would be thrown against the cushion instead of the rigid structure, and life of the passenger would be saved.

It is an essential object of this invention to provide an automatic safety device for the protection of life of the driver and passengers of a moving vehicle in the event of a crash, utilizing the resilient properties of a gas-inflated elastic bag as an impact absorber, the instantaneous explosion of an explosive in a gas producer unit for the production of a large quantity of non-inflammable gas for inflating the bag, and an electric triggering unit for igniting the explosive adapted to be activated by the movement of a weight freely supported by the vehicle, the movement being caused by the inertia of the weight at the time of crash.

Another object of the invention is to provide one or more of elastic bags, each coupled with an individual gas producer unit and installed at strategic positions inside the vehicle such as seat-backs, side and front windows, ceiling, etc., each gas producer unit being connected electrically to a specific contact point in the triggering unit, and arranged so that in the event of a crash, the triggering unit would automatically select the most appropriate set, depending on the direction of the crash impact, and cause this particular elastic bag to be inflated with gas.

These and other objects and advantages will become apparent when preferred embodiments of this invention are considered in connection with the drawings and following descriptions.

Figure 8:
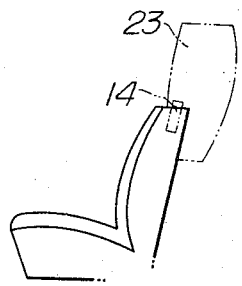
Figure 6:
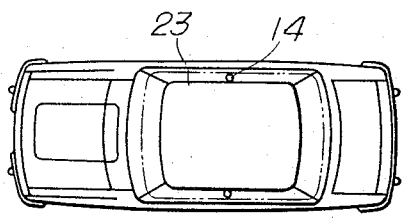
Figure 9:
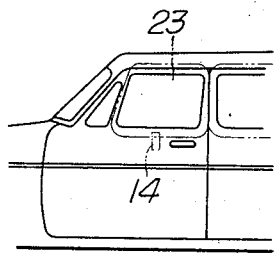
Figure 7:
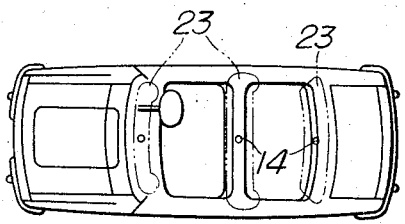

In the drawings:

FIG. 1 is a schematic side view of a preferred complete apparatus of the present invention, FIG. 2 is a sectional side view of the triggering unit of the apparatus, FIG. 3 is a top plan sectional view of the same triggering unit, FIG. 4 is a sectional side view of the gas producer unit of the apparatus, FIG. 5 is a side view of an automobile installed with the apparatus, FIG. 6 is a top plan view of the automobile, FIG. 7 is a top plan view of the automobile installation shown in FIG. 5 showing section at horizontal plane X–Y, FIG. 8 is a side view of an impact-absorbing electric bag as fitted to the seat-back of an automobile, and FIG. 9 is a side view of an automobile with its side windows fitted with elastic bags.

In FIG. 1, A is a triggering unit; B, a secondary battery; 14, a gas producer unit; 23, an impact-absorbing elastic bag; and 7 and 7', electric cables connecting the triggering unit to the gas producer unit through the secondary battery.

The construction of the triggering unit is shown in FIGS. 2 and 3. A solid disc form weight 1 is supported underneath by a rod spring 2 which is anchored at its lower end to the bottom plate 10 of a cylindrically formed housing 6 through a center piece 9. An annular contact ring 4, which is formed of several contact pieces annularly arranged in end-to-end relation with insulators inserted therebetween and supported by the housing 6 through an insulating annular body 5, surrounds the weight 1 concentrically, and each of the contact pieces is fitted with a conductive rod or terminal piece 4' which extends outwardly beyond the wall of the housing 6 as sheathed by another insulator 5'. Another terminal piece 4" for the weight 1, which is grounded to the housing 6 through the rod spring 2, is provided on the outside surface of the cylindrical housing 6. Cable connections 7 and 7' are made from each of the terminals 4' and the terminal 4" to terminals provided in the gas producer units, so that each contact piece is connected to an individual gas producer unit through a common secondary battery, and so that the circuit leading to a particular gas producer unit would be closed by the corresponding contact piece making contact with the weight 1.

The mass of weight 1 and the stiffness of rod spring 2 are so determined that the effect of the initial momentum of weight 1 at the time of crash and the crash impact transmitted to the contact ring 4 through the housing would cause weight 1 to be displaced momentarily from its normal position and hit one of the contact pieces surrounding it, depending on the direction of the impact.

A small piece 11 with a slight depression on its top is fixed on the upper surface of the weight 1. In order to ensure that weight 1 would not be thrown out of position by ordinary movements of the vehicle or any force short of that of a crash impact, a spring-loaded sphere 12, attached to the top cover of housing 6, is made to press against the depression on the piece 11.

In the gas producer unit 14 shown in FIG. 4, a screw-threaded plug 16 with a capsule 17 attached on its top is passed through the bottom of a high pressure resistable cylinder 14'. Cables 7, 7' from terminal pieces 4', 4" are led through the plug 16 to a pair of electrodes 18, 18' set inside the capsule 17, forming a spark gap. The capsule is filled, through a cap-covered opening provided on top, with such an explosive that would rapidly generate a large quantity of non-inflammable gas when ignited.

A flange 22 extending from the cylinder 14' is fastened to an opening provided at the bottom of elastic bag 23 so that the canopy plate 21 supported by columns 20 will protrude into the bag.

Briefly, the operation of the above-described device is as follows:

In the event of a crash, the impact of the collision would be transmitted to the contact ring 4 of the triggering unit through its housing which is attached to the floor or other rigid structure of the vehicle. The weight 1 spring-supported inside the contact ring 4, however, would only be slightly affected by the impact initially because of the considerable amount of momentum it possesses plus the shock-absorbing effect of the spring 2 supporting it. The result would be that the weight 1 would be thrown out of its central position relative to the contact ring 4 in a direction opposite to the direction of the crash impact, and hit a contact piece facing it, thus closing the circuit 7, 7' leading to the gas producer unit connected with this particular contact piece. The explosive enclosed in the gas producer unit 14, being ignited by this action, would explode and generate a large quantity of non-inflammable gas. The gas will be delivered into the elastic bag at an initial speed approaching that of sound, thus inflating the elastic bag to its fullest extent in split-second time. The reaction due to the sudden release of high pressure gas into the elastic bag will be offset by the impact of gas against the canopy plate 21 which is placed at a certain distance from the delivery nozzle in way of the gas stream.

By carefully planning the layout of the gas producer units 14 and elastic bags 23 to be installed in the vehicle, giving full consideration to the location of each unit in conjunction with the position of the corresponding contact piece of the contact ring 4, it can be made so that in the event of a crash, the elastic bag 23 installed at the most appropriate location, depending on the direction of the crash impact, would be automatically selected and inflated. For example, in case of a straight rear-end crash, the weight 1 would be thrown backward and make contact with the contact piece placed directly behind it. In other words, the gas producer unit 14 and elastic bag 23 connected with this particular contact piece would be automatically selected and inflated in case of a straight rear-end crash. It follows, therefore, that a passenger in this case would be fully protected against all rear-end crashes if the gas producer unit 14 and elastic bag 23 so connected is placed directly behind the passenger. The same applies also to crashes from any direction, the only difference being in the location of the elastic bag to be inflated, and the position of the contact piece connected to it.

From the foregoing description, it will be readily seen that there has been produced such a device as will substantially fulfill the objects of the invention as set forth herein.

Although this invention has been disclosed and illustrated herein with reference to a particular application, the principles involved are susceptible of numerous other applications which will be apparent to persons skilled in the art. This invention is, therefore, to be limited only as indicated by the scope of the appended claims.

What is claimed is:

1. In a system for protecting passengers in a moving vehicle in which a vehicle compartment includes therein inflatable bag means, fluid-pressure generator means connected to said inflatable bag means, and inertia-responsive switch means connected to said fluid-pressure generator means for actuating the fluid-pressure generator means due to an impact on the vehicle above a predetermined value, the improvement comprising: a source of current, inertia-responsive switch means comprising a housing electrically connected in series to said source of current through said fluid-pressure generator means, said housing including a flexible, spring-rod electrically connected at one end to said housing and mounted at said one end in the housing, a current-conductable, weight element adjustably mounted on said rod adjacent the terminal end thereof for controlling the amplitude of oscillation of said rod, a retainer piece removably secured on the terminal end of said rod and having a depression extending axially toward said rod, said housing including a spring-urged ball element retained on the housing in opposition to the terminal end of said rod and engaged in said depression and normally retaining said rod and weight against oscillatory movement, said housing including electrical contact means insulated from said housing and disposed in the path of movement of said current-conducting weight element, said electrical contact means being electrically connected in series through said fluid-pressure generator means to said current source whereby vehicle impact causes said inertia-responsive switch means to close a circuit to said fluid-pressure generator means and inflate said inflatable bag means.

2. In the system as claimed in claim 1 in which said inflatable bag means comprises a plurality of bags, each of said bags including a separate fluid-pressure generator means, each of said fluid-pressure generator means having a conductor connected to said source of current, said current conductor comprising a plurality of independent, arcuate segments each respectively connected to one of said respective fluid-pressure generator means whereby at least one or more of said inflatable bags will be inflated when the vehicle receives an impact over a predetermined force from the front, rear or either side of the vehicle.

3. In the system as claimed in claim 1 in which said fluid-pressure generator means comprises a housing having means for generating gas at one end, said housing having a portion secured in an opening in said inflatable bag means, said housing including a plate overlying and extending transversely to said means for generating gas and having lateral openings communicating with the interior of said inflatable bag means whereby generated gas is discharged directly onto said transverse plate and laterally into said bag means.

References Cited

UNITED STATES PATENTS

| | | | |
|---|---|---|---|
| 2,705,267 | 3/1955 | La Roza | 200—61.49 |
| 2,834,606 | 5/1958 | Bertrand | 280—150 |
| 2,850,291 | 9/1958 | Ziccardi | 280—150 |
| 3,005,643 | 10/1961 | Dugan et al. | 280—432 |
| 3,053,949 | 10/1962 | Johnson | 200—61.49 |

LEO FRIAGLIA, *Primary Examiner.*

BENJAMIN HERSH, *Examiner.*

L. D. MORRIS, *Assistant Examiner.*